(12) United States Patent  
Monti

(10) Patent No.: US 8,096,451 B2  
(45) Date of Patent: Jan. 17, 2012

(54) APPARATUS FOR VOLUMETRIC BATCHING OF GRANULAR OR POWDER PRODUCTS IN A CONTAINER

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 805 days.

(21) Appl. No.: 12/203,861

(22) Filed: Sep. 3, 2008

(65) Prior Publication Data

US 2009/0086567 A1 Apr. 2, 2009

(30) Foreign Application Priority Data

Sep. 28, 2007 (IT) ................ B02007A0663

(51) Int. Cl.
*B65B 1/36* (2006.01)
*G01F 11/24* (2006.01)

(52) U.S. Cl. ......... 222/452; 222/636; 366/135; 366/232

(58) Field of Classification Search .............. 366/9, 135, 366/187, 188, 220, 232; 221/13, 182; 222/306, 222/335, 424.5, 425, 442, 444, 450, 452, 222/630, 636, 637, 643

See application file for complete search history.

(56) References Cited

U.S. PATENT DOCUMENTS

| | | | | |
|---|---|---|---|---|
| 995,812 A | * | 6/1911 | Stevens | 222/41 |
| 1,563,756 A | * | 12/1925 | Liberman | 222/80 |
| 1,876,332 A | * | 9/1932 | Mabey | 222/113 |
| 2,116,300 A | * | 5/1938 | Campos | 141/369 |
| 2,584,726 A | * | 2/1952 | Mcomber | 222/306 |

(Continued)

FOREIGN PATENT DOCUMENTS

GB 1456787 A 11/1976

(Continued)

OTHER PUBLICATIONS

International Search Report.

*Primary Examiner* — Yogendra Gupta
*Assistant Examiner* — Emmanuel S Luk
(74) *Attorney, Agent, or Firm* — William J. Sapone; Coleman Sudol Sapone P.C.

(57) ABSTRACT

The apparatus is constituted by at least an operating unit comprising: a chute, inferiorly associated to a hopper for containing granular or powder product, the chute being extended downwards to convey the product towards an underlying container; a rotary obturator having a horizontal axis X, for transversally occluding the chute and being laterally provided with an opening destined to place the chute in communication with a batching chamber, realized internally of the body of the obturator and delimited, on an opposite side to the opening, by a gas-permeable wall; a conduit connected at an end thereof to the batching chamber, via the wall, and at another end thereof to aspirating and blowing means; motorized organs for commanding rotations of the obturator, with which the opening is alternatingly oriented upwards, during the loading stage, in order to enable the granular or powder products, falling from the hopper and introduced into the upper part of the chute to enter the batching chamber, which is depressed thanks to the action of the aspirating means, and in a downwards direction, during the subsequent delivery stage, to enable the batched volume of granular or powder product, projected by a jet of pressurized gas generated by the blowing means, to exit the batching chamber and enter the lower part of the chute to descend towards the container.

13 Claims, 3 Drawing Sheets

U.S. PATENT DOCUMENTS

| | | | | |
|---|---|---|---|---|
| 2,652,935 A | * | 9/1953 | Messing | 414/220 |
| 3,823,844 A | * | 7/1974 | Linkemer et al. | 221/13 |
| 3,910,428 A | * | 10/1975 | Peterson, II | 414/292 |
| 3,998,239 A | * | 12/1976 | Kruishoop | 137/101.11 |
| 4,013,198 A | * | 3/1977 | Miklas | 222/438 |
| 4,013,199 A | * | 3/1977 | Brown | 222/438 |
| 5,163,656 A | * | 11/1992 | Sigmon | 251/314 |
| 5,244,019 A | * | 9/1993 | Derby | 141/65 |
| 5,738,249 A | * | 4/1998 | Kikuchi et al. | 222/148 |
| 6,360,920 B1 | * | 3/2002 | Corominas | 222/262 |
| 2005/0023288 A1 | * | 2/2005 | Zill et al. | 222/1 |

FOREIGN PATENT DOCUMENTS

| | | |
|---|---|---|
| JP | 10236435 A | 9/1998 |
| WO | WO8302434 A | 7/1983 |
| WO | WO2006072460 A | 7/2006 |

* cited by examiner

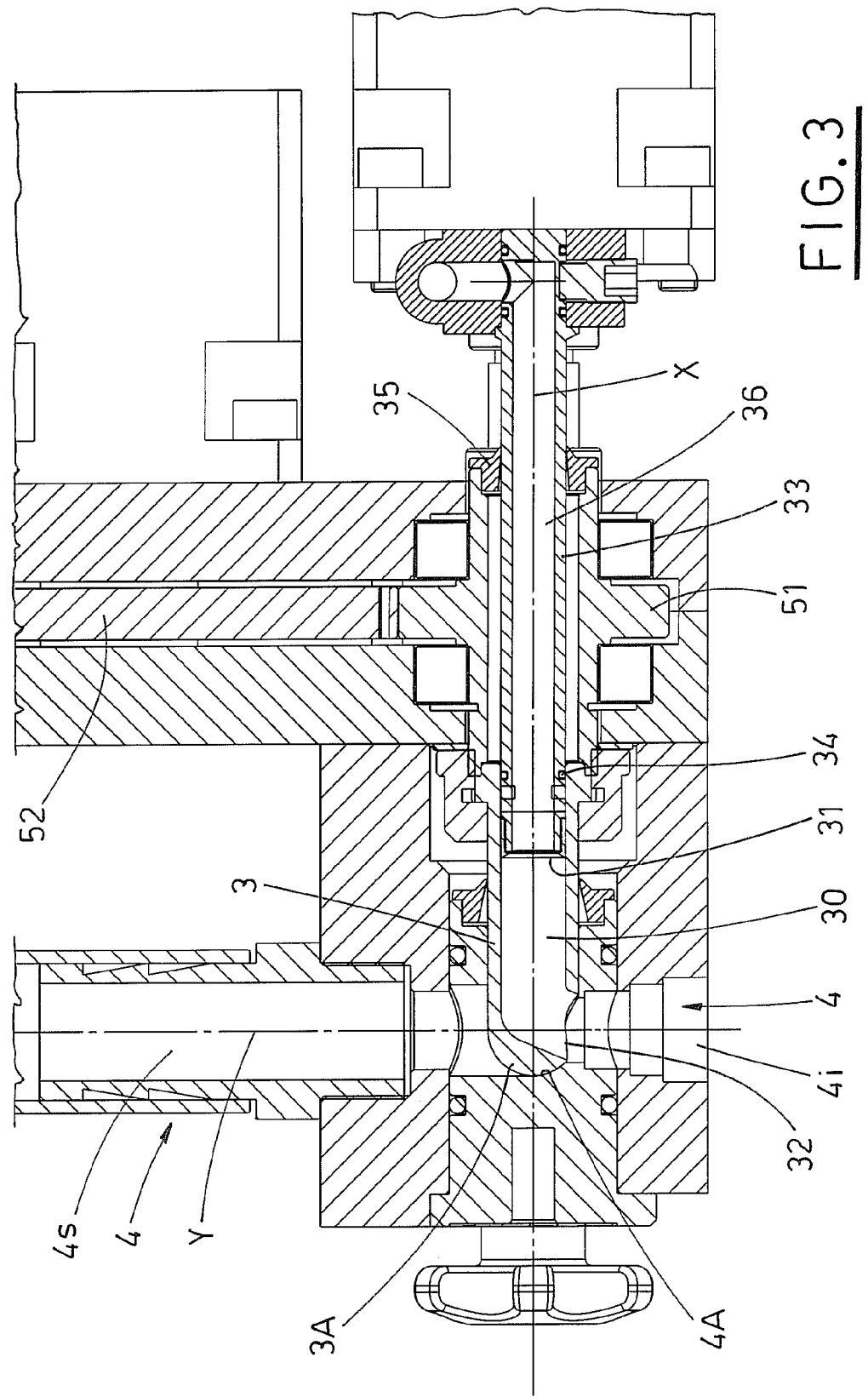

APPARATUS FOR VOLUMETRIC BATCHING OF GRANULAR OR POWDER PRODUCTS IN A CONTAINER

BACKGROUND OF THE INVENTION

The invention concerns the technical sector relating to inserting batched quantities of granular or powder products in containers therefore, in the field of automated packing processes.

As is known, in order to define a predetermined quantity of a substance the weight parameter or the volume parameter can be used, according to what is optimal for the specific situation.

In particular, the invention relates to an apparatus in which the granular or powder product is batched with reference to a volume thereof.

On Feb. 4, 2007, the same applicant filed an Italian application for a patent, no. BO2007A 000236, entitled: "A Method for Batching Powder and/or Granular Products internally of Container Elements and an Apparatus destined to Actuate the Method," in which a technical solution is provided which includes an obturator arranged transversally with respect to a vertical channel, superiorly delimited by a gas-permeable wall and inferiorly opening into the container into which a batched quantity of product is to be deposited.

The obturator is axially mobile between an advanced position, in which it occludes the vertical channel, and a retracted position, in which it is free.

With the obturator in the advanced position, a batching chamber having a predetermined adjustable volume is defined in the vertical channel between the obturator and the wall, which chamber is in communication with the supply hopper of the product via a recess, provided for this purpose in the upper part of the obturator, and an inlet conduit, realized laterally of the vertical channel.

The combined action of a star valve which pushes the product into the introduction conduit and a source of depression which, via the gas-permeable wall, places the batching chamber under a depression, determines an inflow of product into the chamber up until it is completely full.

A following retraction of the obturator, actuated in phase relation with the switching between the aspirating action produced by the depression source to a blowing action, generated by a pressure source and transmitted through the permeable wall, causes downwards projection of the batched quantity of product accumulated in the batching chamber, which is then introduced into the underlying container.

The above-described apparatus has been shown to fully satisfy expectations as regards precision of the batching and reliability of functioning: however, during experimentation, some technical-functional aspects have emerged which are not entirely satisfactory.

A first aspect relates to the fact that the cyclic displacement of the obturator towards the advanced position thereof causes an impact to occur, due to encountering of the head of the obturator with the wall of the vertical channel; the noise deriving from this impact can be tolerable where the batching apparatus has one obturator only, or a small number thereof, while it can be excessive in those applications where a battery of obturators is present, working in synchrony on a row of corresponding containers.

A second aspect relates to the development of the path the products is forced to follow from the hopper to the batching chamber, as it is bendy, is subject to passage section narrowing and blind corners, and further the final tract is directed substantially upwards; it follows that filling of the batching chamber is slowed down and therefore the frequency of the operating cycles cannot be very high; further, with very fine powder substance, which does not flow very fast, stagnation of material can occur in some points of the path, due to compacting, with an ensuing need to intensify cleaning interventions.

SUMMARY OF THE INVENTION

The aim of the present invention is thus to provide an apparatus for volumetric batching of granular or powder products conformed such as to obviate the above-mentioned drawbacks, while at the same time maintaining characteristics of precision of batching and reliability at at least a same level as with the reference known solution described in the preamble hereto.

A further aim of the invention relates to providing an apparatus which is capable of treating granular or powder materials equally and optimally, even where the powders are very fine powders.

A further aim of the invention consists in providing an apparatus which, by virtue of its original conception, is constituted by a small number of components of simple construction and assembly, such as to make the production costs particularly contained.

The above aims are obtained by means of an apparatus for volumetric batching of granular or powder products in a container, comprising: a hopper for containing the granular or powder products; at least a botching chamber for receiving a predefined volume of the product from the hopper during a loading stage of the batching chamber; a gas-permeable wall delimiting a bottom wall of the batching chamber; aspirating means for placing the batching chamber in depression, through the gas-permeable wall, during the loading stage; blowing means, activated alternatingly to the aspirating means in a subsequent delivery stage, which generate a pressurized gas jet which is injected into the batching chamber through the permeable wall and is able to project the predefined volume of granular or powder product towards the container, with the apparatus being constituted by at least a modular operating unit, characterized in that it comprises: a chute, inferiorly associated to the hopper and extending downwards, for conveying the granular or powder product towards the underlying container; a rotary obturator arranged with a substantially horizontal axis, for transversally occluding the chute, provided laterally with an opening for setting the chute in communication with the batching chamber, the batching chamber being realized internally of the body of the obturator and delimited, on an opposite side with respect to the opening, by the gas-permeable wall; a conduit, associated to the obturator and connected, at an end thereof, to the batching chamber via the permeable wall, and at another end thereof, to the aspirating and blowing means; motorized organs for commanding rotations of the obturator, by action of which the opening is alternatively oriented upwards, during the loading stage, in order to enable the granular or powder product, falling from the hopper and introduced into the upper part of the chute, to enter the batching chamber, and is alternatively oriented downwards, during the delivery stage, to enable the predefined volume of granular or powder product to exit the batching chamber and enter the lower part of the chute to descend towards the container.

BRIEF DESCRIPTION OF THE DRAWINGS

The characteristics of the invention will emerge from the following description of a preferred embodiment of the apparatus, in agreement with what is reported in the claims and with the aid of the enclosed figures of the drawings, in which:

FIG. 3 is an enlarged-scale illustration of a portion of FIG. 2, which better evidences some constructional details.

DESCRIPTION OF THE PREFERRED EMBODIMENTS

Figure 1:
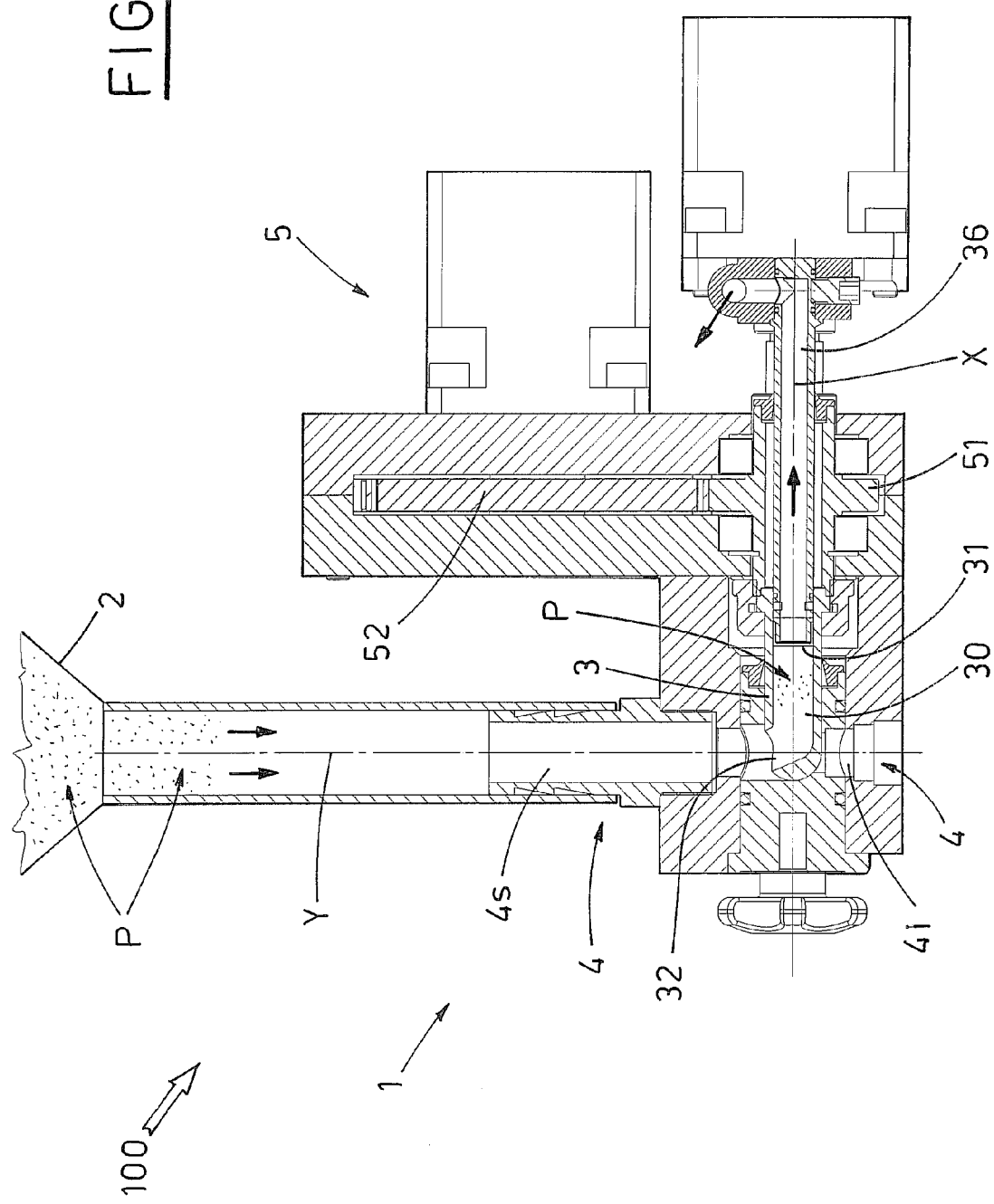
FIG. 1 is a vertical section of the apparatus of the invention, in a loading configuration of the batching chamber.

With reference to the figures of the drawings, 100 denotes in its entirety the apparatus of the invention.

The apparatus 100 is designed to be associated to an automatic machine, not illustrated, for filling containers, such as for example vials or the like, also not illustrated, with batched quantities of a granular or a powder product P.

The apparatus 100 is modular and each operating unit 1, to which the accompanying figures relates, is able to fill a corresponding container.

Should it be intended for mounting to machine for treating various containers at the same time, for example aligned on transversal rows, it is possible to assemble a battery constituted by a number of operating units 1 which is equal to the number of containers on each of the rows.

In known way, the apparatus 100 comprises a hopper 2 (partially illustrated) which is destined to contain a stock of the granular or powder products P.

The hopper 2 will supply one or more of the operating units 1, in each of which there are: a batching chamber 30, for receiving a predefined volume of the product P from the hopper 2 during a loading stage; a gas-permeable wall 31, delimiting the bottom wall of the batching chamber 30; aspirating means (not illustrated) for creating a depression 30 in the batching chamber through the permeable wall 31 during the above-mentioned stage of loading; blower means (also not illustrated), activated alternatively to the aspirating means in a following delivery stage, for generating a jet of pressurized gas, introduced into the batching chamber 30, through the permeable wall 31, able to project the predefined volume of granular or powder products P towards the relative container.

In each operating unit 1 of the apparatus 100, according to the invention, a chute 4 is provided, preferably straight and vertical, inferiorly associated to the hopper 2 and extending downwards, for conveying the granular or powder product P towards the relative underlying container.

The chute 4, in an intermediate position thereof, is occluded by a rotary obturator 3, arranged transversally thereto, cylindrical in shape and having an axis X which is more or less horizontal; in a preferred embodiment, which is however non-limiting, the axes Y, X of the chute 4 and the obturator 3 are perpendicular to one another.

The rotary obturator 3 meets the wall of the chute 4 with a hemispherical head 3A thereof which adheres to a correspondingly shaped section 4A of the chute 4, such as to increase the rest surface and thus the seal thereof.

The rotary obturator 3 is laterally provided with an opening 32, more or less centered with respect to the axis Y of the chute 4, which sets the chute 4 in communication with the batching chamber 30, realized internally of the body of the obturator 3, with a horizontal and delimited development, on the opposite side of the opening 32 from the gas-permeable wall 31.

The wall 31 is solidly constrained to a cursor 33 which is axially inserted in the obturator 3 and which is adjustable in predefined positions in order to vary, within a predefined range, the capacity of the batching chamber 30.

The accompanying figures illustrate the condition in which the batching chamber 30 is regulated more or less to the maximum capacity thereof.

Seal gaskets 34, 35 are provided between the cursor 33 and the obturator 3.

The cursor 33 affords an axial conduit 36, set in communication at an end thereof with the batching chamber 30, via the permeable wall 31, and at another end thereof with the aspirating and blowing means (not illustrated).

Motor organs 5 are associated to the obturator 3, for commanding 180° rotations of the obturator 3, via which the opening 32 is alternatively positioned upwards or downwards, as will be more fully described herein below.

The motor organs 5, in the example of the figures, comprise a cogged pinion 51, coaxial to the axis X of the obturator 3 and solidly constrained thereto, enmeshed with a cogwheel 52 activated by an electronically-controlled motor, for example a brushless or step motor.

There now follows a brief description of the apparatus 100, which can be deduced from the accompanying figures of the drawings, with particular reference to the aspects relating to the present invention.

During the loading stage (FIG. 1) the motorized organs 5 command the rotation of the obturator 3 in order to arrange the opening 32 facing upwards, in order to enable the granular or powder products P, falling from the hopper 2 and into the upper part 4s of the chute 4, to enter the batching chamber 30.

Once the batching chamber 30 has been filled, including with the aid of the aspirating means which set it in depression through the permeable wall 31, a 180° rotation of the obturator 3 is commanded, which brings the opening 32 to face downwards, such as to close the upper part 4s of the chute 4 and thus stop the product from falling downwards.

Figure 2:
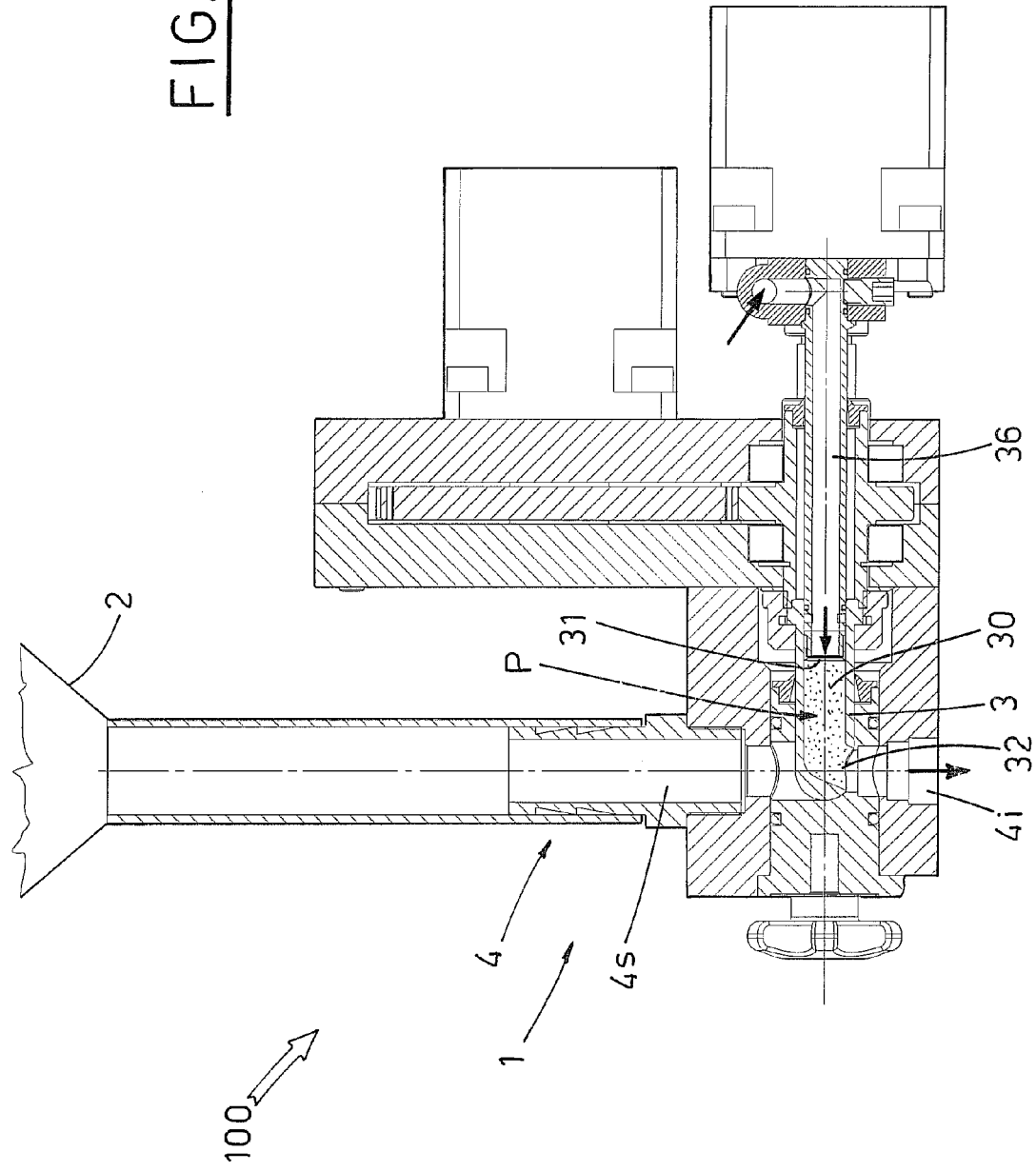
FIG. 2 illustrates, according to the same section as in FIG. 1, the delivery configuration of the batched quantity of product towards the underlying container.

In a phase-relation with the rotation, the action of the aspirating means is stopped and that of the blowing means is activated, to actuate the delivery stage (FIG. 2), in which the volume of previously-batched granular or powder products P is pushed by the pressurized gas jet to exit from the batching chamber 30 and pass into the lower part 4i of the chute 4, in order to fall towards the underlying container.

At this point, the operating cycle is concluded; with a subsequent rotation by 180° of the obturator 3, and a further switching of the activation between the blowing and aspirating means, a new cycle is started.

The foregoing illustrates very clearly the positive characteristics of the apparatus of the invention, in comparison with the solution cited in the preamble and with the aim of obviating the drawbacks manifested thereby.

Primarily, the choice of a rotary obturator eliminates the impacting and therefore the noisiness of the alternating slide valve, so that even an apparatus consisting of a battery of many operating units is absolutely silent and vibration-free.

The conformation of the chute and the batching chamber, developing horizontally in the body of the obturator, enables a very linear path to be defined for the product, without upwards tracts, sharp narrowings of section and blind corners in which the product can stick and stagnate.

The advantage of this conformation is very clear especially during the loading stage in which the inlet of the product into the batching chamber, favoured by the force of gravity, is less opposed and is therefore faster, and furthermore does not require mechanical thrust actions, such as those given by the star valve of the known solution, which might problematically compact very fine powder material and give rise to a clogging effect which then requires maintenance and cleaning interventions, with the machine shut down.

All of this enables increase of the frequency of the operating cycles of the apparatus and, consequently, the productivity of the machine to which the apparatus is associated.

The proposed apparatus, thanks to its characteristics, can treat either granular or powder products equally and without any significant difference in performance, even where the powder product is very fine.

No effect is made on the characteristics of high volumetric batching precision and general reliability.

As can be seen from the accompanying figures of the drawings, the apparatus exhibits a small number of components, which are of simple construction and assembly, such as to keep production costs particularly contained.

In the illustrated example, it has been supposed that the rotation of the obturator 3 between the two extreme positions thereof is 180°; obviously, however, for the expert in the sector it can slightly vary, either increasing or decreasing, in a case in which the chute were not perfectly straight but exhibited a small angle between the relative upper and lower parts.

In the description it has not been specified which direction the rotations by 180° take place; this is because it would be perfectly possible to make the obturator perform alternate rotations first in one direction then in another, or always in the same direction.

The above however is intended to be a non-limiting example, so any eventual modifications to details of the described components, for technical and/or functional reasons, are to be considered as falling within the ambit of protection defined by the following claims.

What is claimed is:

1. An apparatus for volumetric batching of granular or powder products in a container, which comprises: a hopper for containing the granular or powder products; at least a batching chamber for receiving a predefined volume of the product from the hopper during a loading stage of the batching chamber; a gas-permeable wall delimiting a bottom wall of the batching chamber; aspirating means for placing the batching chamber in depression, through the gas-permeable wall, during the loading stage; blowing means, activated alternatingly to the aspirating means in a subsequent delivery stage, which generate a pressurized gas jet which is injected into the batching chamber through the permeable wall and is able to project the predefined volume of granular or powder product towards the container, with the apparatus being constituted by at least a modular operating unit, characterized in that it comprises: a chute, inferiorly associated to the hopper and extending downwards, for conveying the granular or powder product towards the underlying container; a rotary obturator arranged with a substantially horizontal axis, for transversally occluding the chute, provided laterally with an opening for setting the chute in communication with the batching chamber, the batching chamber being realized internally of the body of the obturator and delimited, on an opposite side with respect to the opening, by the gas-permeable wall; a conduit, associated to the obturator and connected, at an end thereof, to the batching chamber via the permeable wall, and at another end thereof, to the aspirating and blowing means; motorized organs for commanding rotations of the obturator, by action of which the opening is alternatively oriented upwards, during the loading stage, in order to enable the granular or powder product, falling from the hopper and introduced into the upper part of the chute, to enter the batching chamber, and is alternatively oriented downwards, during the delivery stage, to enable the predefined volume of granular or powder product to exit the batching chamber and enter the lower part of the chute to descend towards the container.

2. The apparatus of claim 1, wherein the chute exhibits a vertical axis.

3. The apparatus of claim 1, wherein the chute exhibits a straight development.

4. The apparatus of claim 1, wherein the axis of the chute and the axis of the rotary obturator are perpendicular to one another.

5. The apparatus of claim 1, wherein the rotations of the obturator are each by 180°.

6. The apparatus of claim 1, wherein the rotary obturator exhibits a hemispherical head which sealingly fits into a corresponding shaped section of the chute.

7. The apparatus of claim 1, wherein the opening of the rotary obturator is arranged substantially centered with respect to the axis Y of the chute.

8. The apparatus of claim 1, wherein the batching chamber develops axially with respect to the rotary obturator.

9. The apparatus of claim 1, wherein it includes regulating organs, for modifying a capacity of the batching chamber within a predetermined range between a minimum and a maximum.

10. The apparatus of claim 9, wherein the regulating organs comprise a cursor which is axially inserted in the rotary obturator and which is adjustable into predefined positions.

11. The apparatus of claim 1, wherein the cursor solidly nears the permeable wall and exhibits an axis hole which defines the conduit.

12. The apparatus of claims 11, wherein it includes seal gaskets interposed between the rotary obturator and the cursor.

13. The apparatus of claim 1, wherein the motorized organs comprise a cogged pinion, coaxial to the axis of the rotary obturator and solidly constrained thereto, which cogged pinion is enmeshed with a cogwheel activated by an electronically-controlled motor.

* * * * *